Feb. 14, 1928.

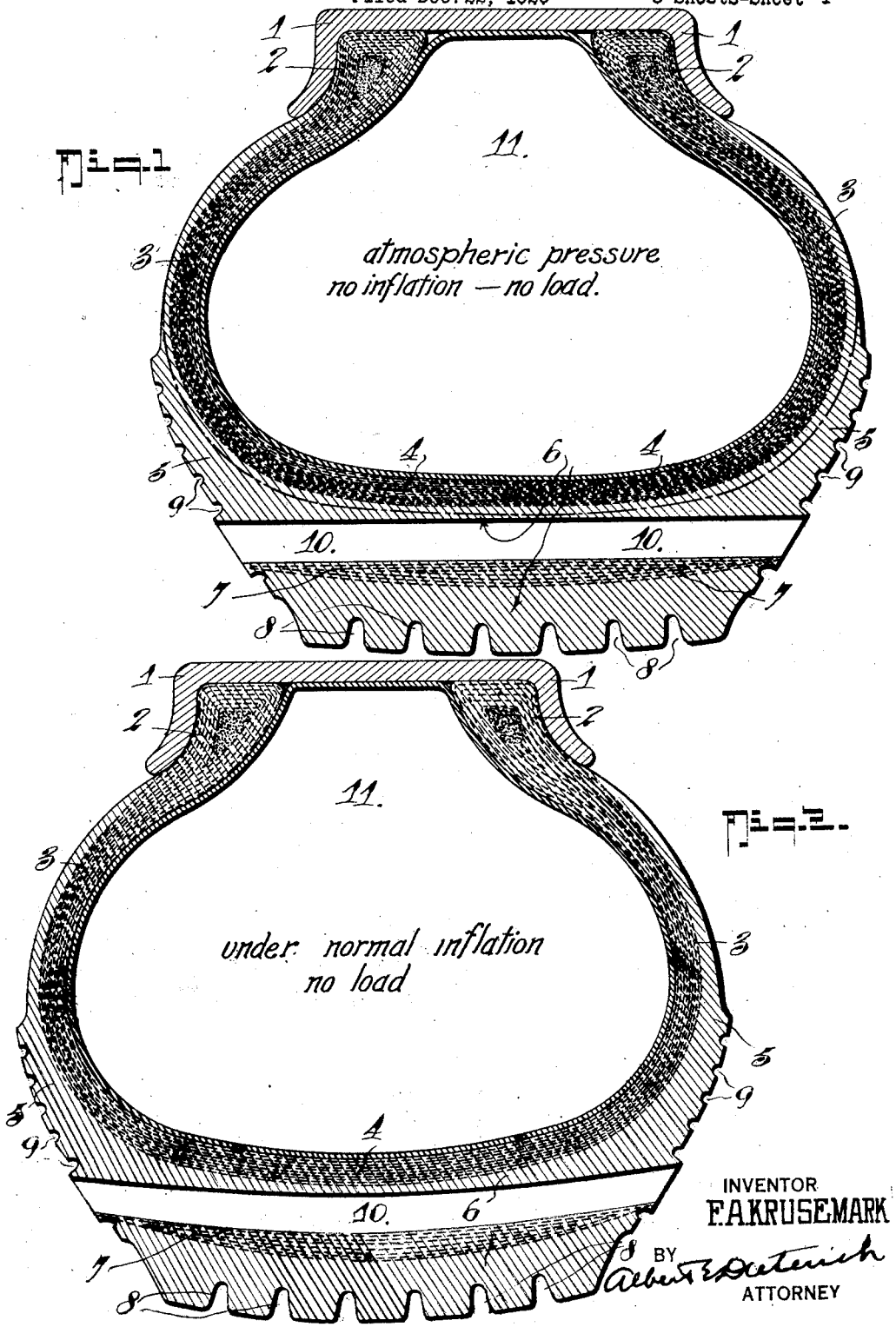

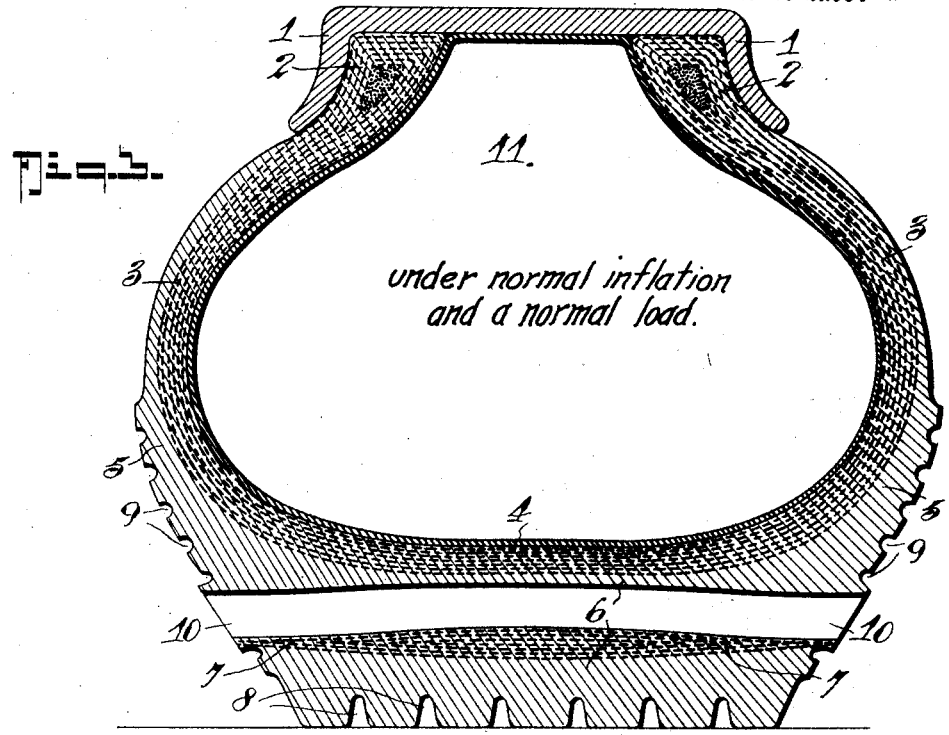
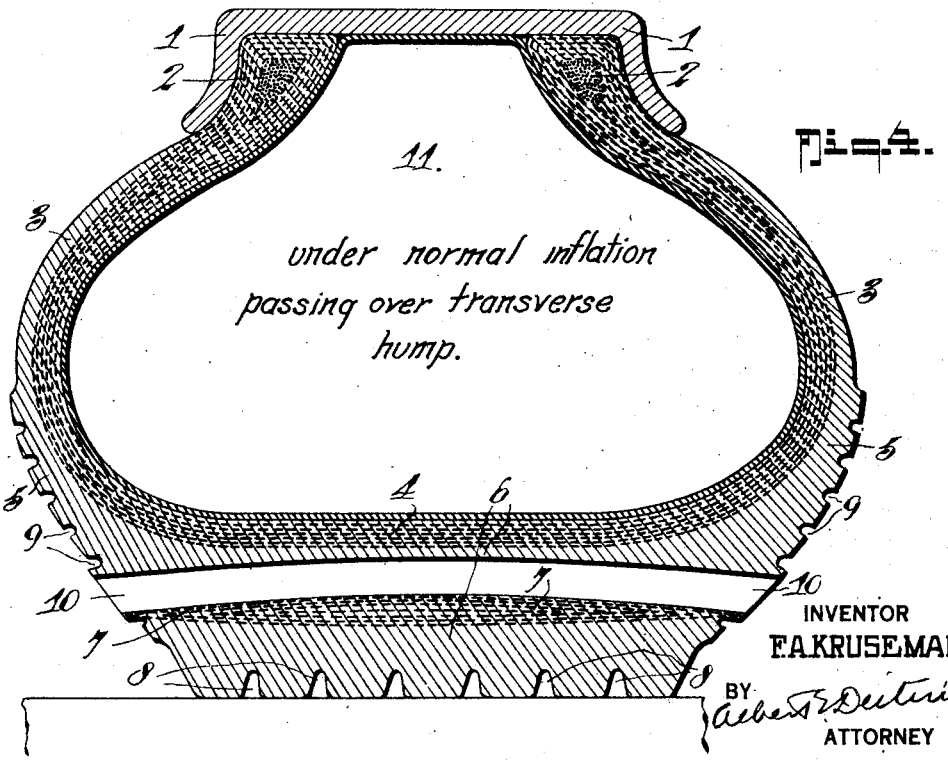

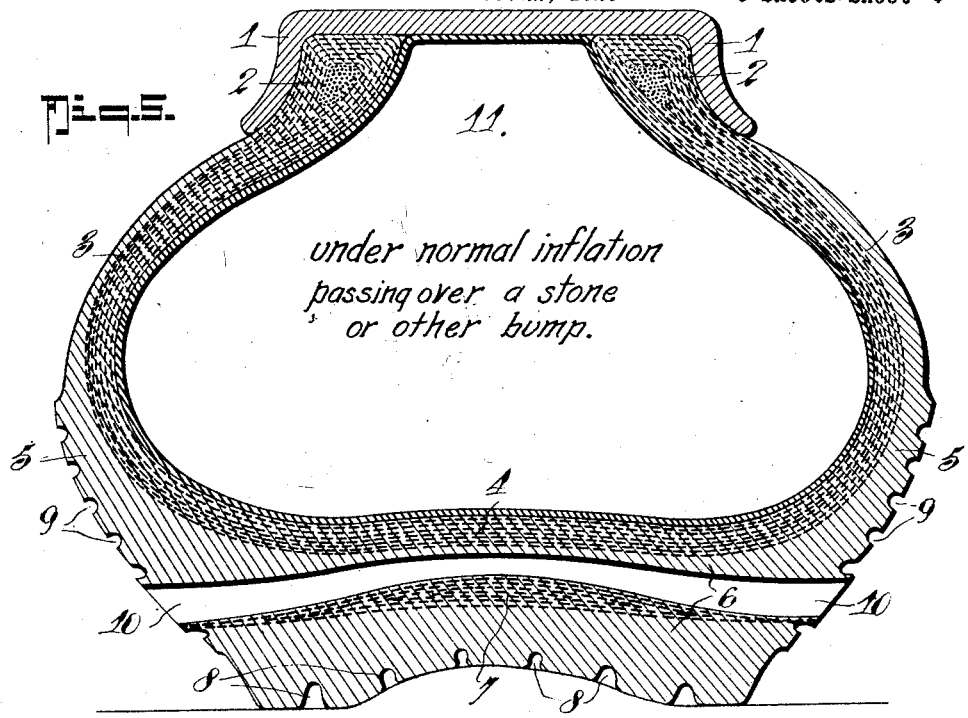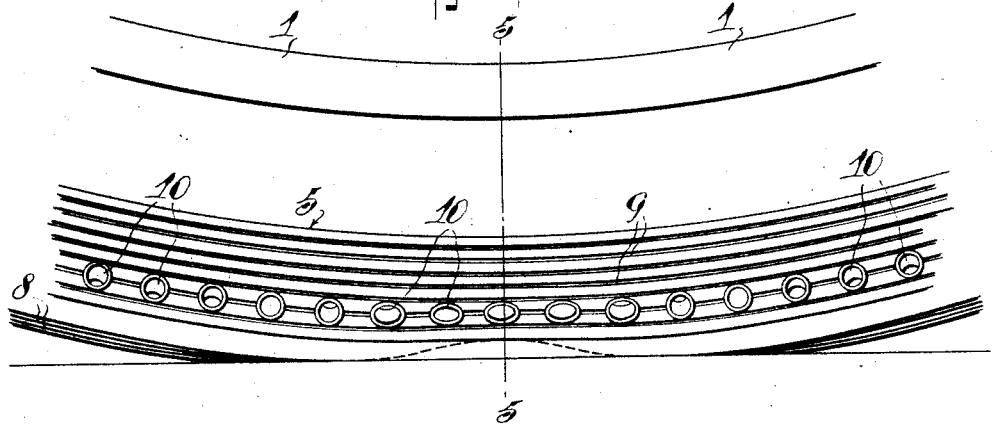

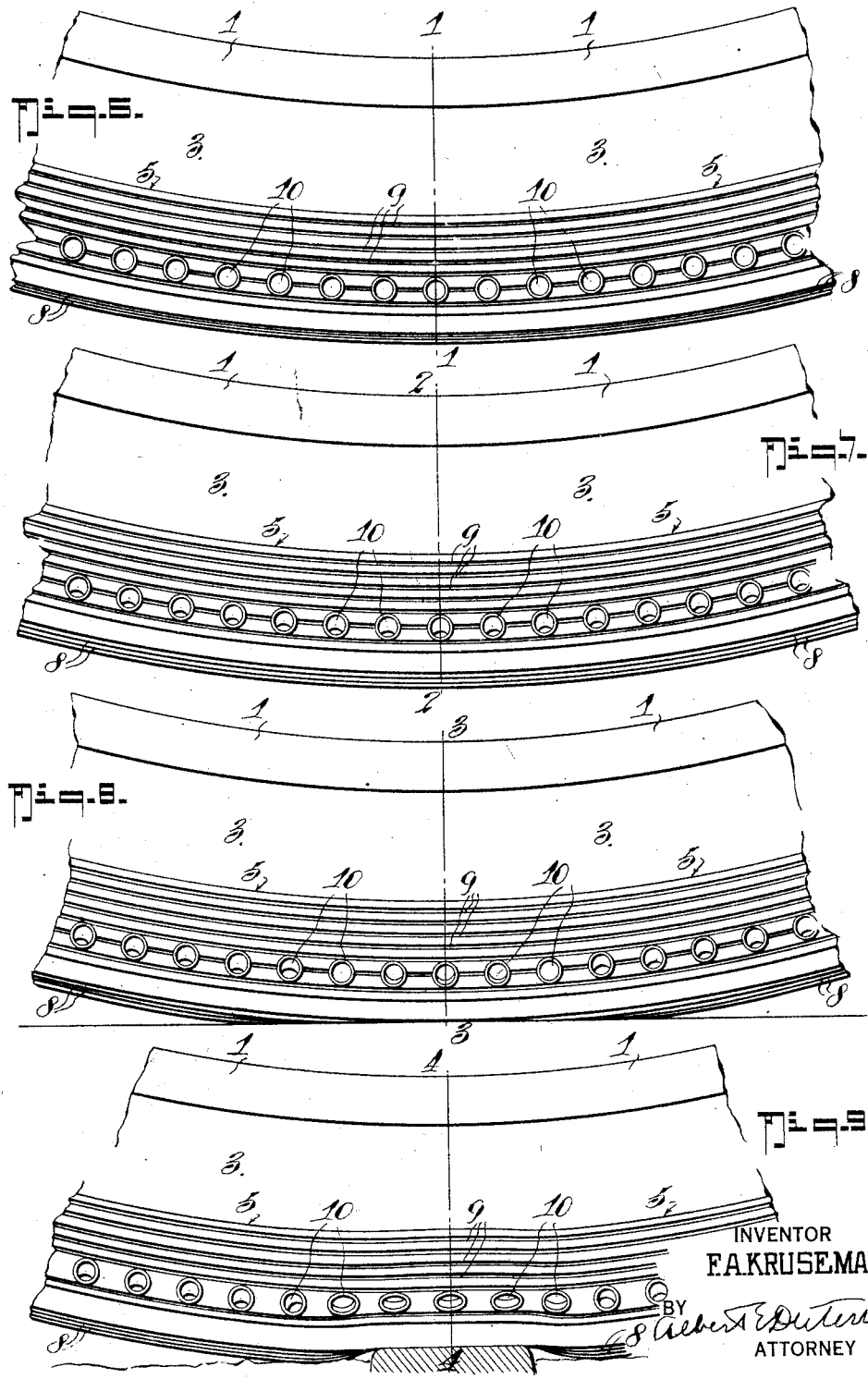

F. A. KRUSEMARK

PNEUMATIC TIRE

Filed Dec. 22, 1925 5 Sheets-Sheet 5

1,659,531

INVENTOR
F. A. KRUSEMARK.
BY Albert E Dieterich
ATTORNEY

Patented Feb. 14, 1928.

1,659,531

UNITED STATES PATENT OFFICE.

FREDERICK A. KRUSEMARK, OF AKRON, OHIO, ASSIGNOR TO LAMBERT TIRE & RUBBER CO., OF BARBERTON, OHIO, A CORPORATION OF ARIZONA.

PNEUMATIC TIRE.

Application filed December 22, 1925. Serial No. 77,048.

My invention has for an object to provide a pneumatic tire, preferably one of the low-pressure-cord or balloon type, with a specially designed tread of cushion rubber so constructed and designed that it will not detract from the several advantages of a pneumatic tire and which will be properly ventilated to free it from destructive heating such as occurs when a tire is run at high speeds; another object is to provide a pneumatic tire with a flexible cushion tread of a thickness that will practically completely eliminate puncturing of the inner tube; again it is an object of my invention to provide a pneumatic tire with a ventilated cushion tread sufficiently thick to prevent punctures but of sufficient flexibility so that all usual road shocks will be principally transmitted through the tread and taken up by the air cushion within the tire, thus enabling the tire to function efficiently as a pneumatic tire; a further object is to produce a puncture-proof or puncture-resisting pneumatic tire having a cushion tread of such flexibility and so thickened that in passing over stones or other similar obstructions flexing of the side walls of the carcass will be reduced to the minimum (thereby increasing the life of the tire) and yet the impact force will be taken up principally by the pneumatic cushion within the tire and only in part by the tread cushion of the tire; a still further object is to provide a pneumatic tire with a puncture-resisting cushion tread ventilated by cross passages or holes united at their outer ends with the atmosphere and so designed and proportioned with respect to the road contacting face of the tread of the tire and to the pneumatic cushion within the tire so that in rolling along the road a whipping vibration will be set up in the holes along their axes, thereby not only to effect a clearing out of the holes of any solids that may have accumulated therein, but also to set up strong air currents for cooling purposes; the invention also has for its object to provide a tire of the character stated which is so designated, proportioned and constructed that the traction waves and strains are broken up, thus preventing tread separation as a result of this structure and also because the traction waves and strains are broken up, cushion gum rolling is prevented. (Cushion gum rolling has reference to the separating or rolling up of the strip of cushion stock that welds the tread portion of the tire to the carcass, this cushion gum rolling of course being caused by the traction wave in conjunction with the heat generated.)

In its more specific nature the invention has for its object to provide a tire of the foregoing general characteristics in which the ventilated holes are located close to the periphery of the pneumatic carcass thereby leaving substantial thickness of cushion rubber between the holes and the tread surface of the tire, a thickness sufficient to result in effect in the production of a rubber belt or band around the set of openings, which band has a tendency to restrict peripheral expansion and compress the rubber members or bars located between adjacent holes, this tendency of the band being preferably augmented by a breaker strip which is located within the band of rubber between the set of holes and the tread surface.

With other objects in view which will appear later the invention also resides in those novel features of construction, combination and arrangement of parts, all of which will be first fully described and then be specifically pointed out in the appended claims, reference being had to the accompanying drawings in which:—

Figure 1 is an enlarged cross section (at the place of contact with the ground) on the line 1—1 of Figure 6, showing the tire in the repose position mounted on a rim before inflation.

Figure 2 is an enlarged cross section on line 2—2 of Figure 7 showing the tire as it appears at the place of contact with the ground when under normal inflation but no load.

Figure 3 is an enlarged cross section on the line 3—3 of Figure 8 showing the tire under normal inflation and under normal load, at the place of contact with the ground.

Figure 4 is an enlarged cross section on the line 4—4 of Figure 9 at the place of contact with the ground showing the tire under normal inflation but passing over a transverse hump such as a curb or rail for example.

Figure 5 is an enlarged cross section on the line 5—5 of Figure 10 at the place of contact with the ground showing the tire under normal inflation and load passing over a hump such as produced by a stone or the like.

Figures 6 to 10 inclusive are detail side elevations on a reduced scale of portions of the tire.

Figure 11:
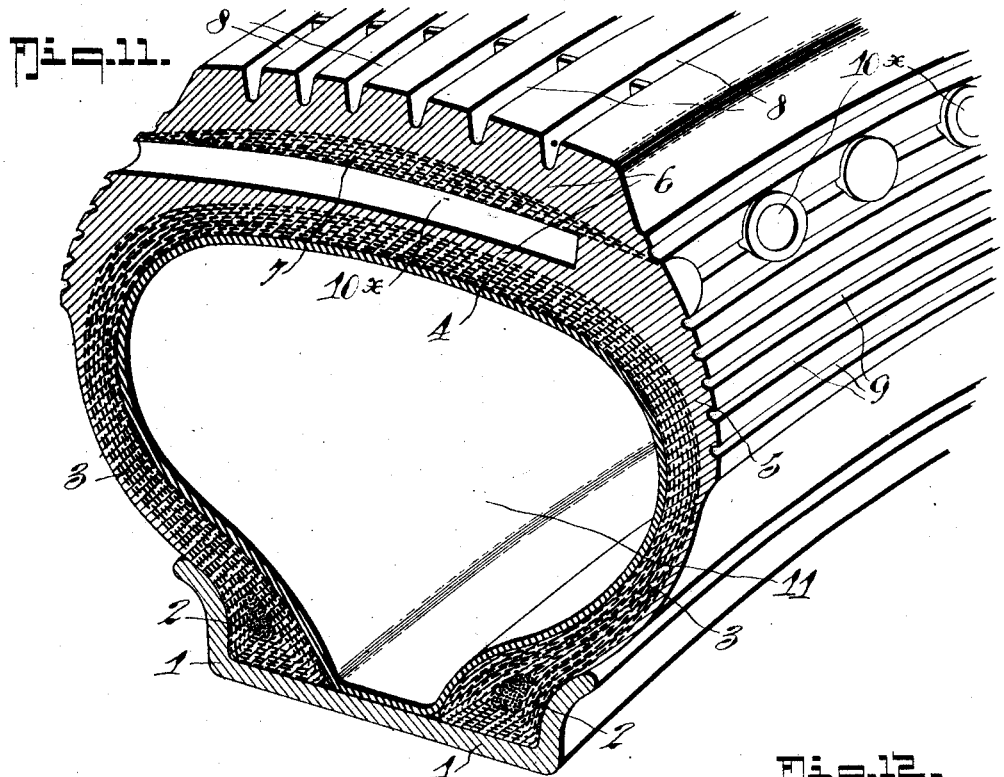

Figure 11 is a sectional perspective view of a modification of the invention hereinafter referred to.

Figure 12:
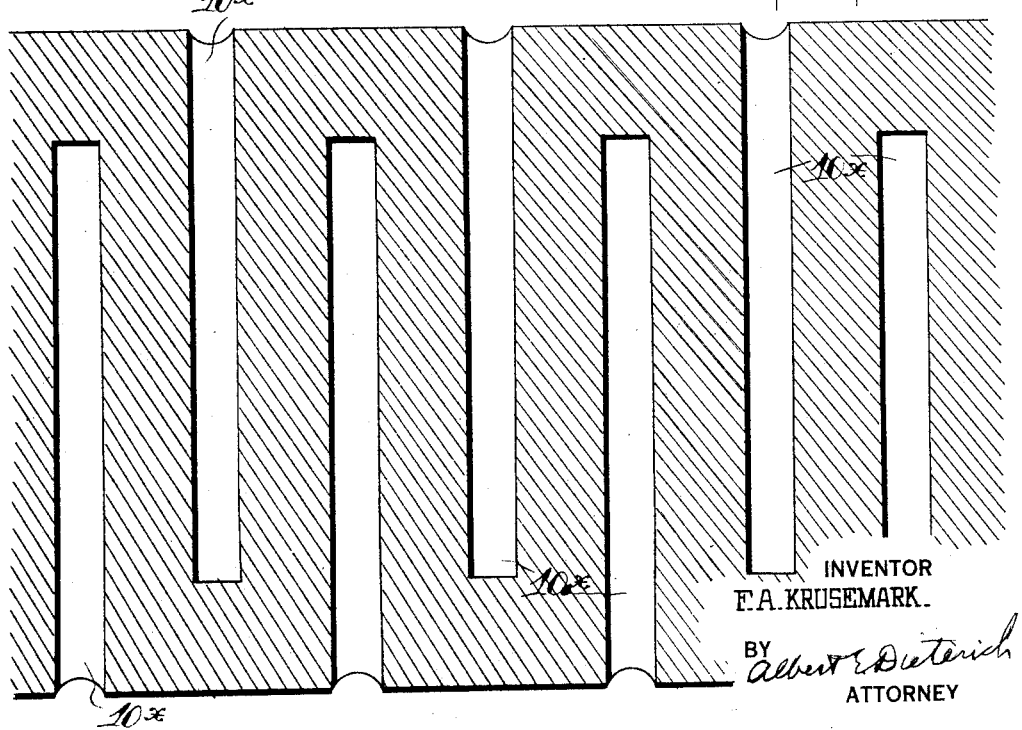

Figure 12 is a lateral section through the tread holes of Figure 11.

In constructing my tire I build up a carcass according to the present accepted low pressure cord or balloon tire practice with the usual beads 2 to fit the rim 1, the relatively thin side walls 3 and peripheral walls 4 composed of rubber and cord or cord fabric, the peripheral outline of the carcass being indicated by the dot and dash line in Figure 1. The tread comprises the annular riding body 6 composed of rubber and the relatively thin side walls 5 preferably grooved at 9 to add the flexure or flexibility of the side walls as well as to add to the ornamental appearance of the tire and present wear ribs to curb or rut-side contacts.

The tread proper 6 is made thicker than according to the usual or standard practice, the thickness being limited to such as will leave a free flexible tread body as distinguished from one of relative solid or rigid nature, so that the tread body may flex and give to road inequalities and conduct the road shocks mainly and practically wholly to the air cushion within the tire. Experience has taught that in pneumatic tire practice as heretobefore understood, the thickness of the tread rubber is limited to approximately twice the carcass wall thickness, the limitation being due to the fact that solid or non-ventilated treads of greater thickness than this have a decided tendency to overheat and disintegrate by centrifugal force at high speeds and also reduce the resiliency of the tire as a whole, so that greater thickness than approximately twice the carcass wall thickness have been found impracticable. Experience has shown that this tendency of the tread to separate from the carcass is due to the heat generated and the traction waves and strains which causes cushion gum rolling. (The traction wave is the wave in the rubber that occurs just ahead of the contact point as the tire rolls.) The traction wave exerts a pulling force at the point where the tread unites with the carcass and if great enough, will cause separation, heat of course greatly weakens the union point which augments the danger of separation. The thicker the tread portion the larger the traction wave and consequently the greater the pull at the point of union. Unless the tread thickness is greater than approximately twice the carcass wall thickness the resistance to puncture is not sufficient to render the tire substantially puncture proof. In my improved tire however, the lateral holes of the tread break up the traction wave at each opening and the pulling force is interrupted and destroyed.

In carrying out my invention, however, I find that the thickness of the tread may be increased from three to four times the carcass wall thickness without encountering the objections noted; this is made possible because of the several changes or departures I have made from standard or accepted practice, viz:—

I provide the tread with transverse holes 10 located adjacent the perimeter of the carcass 4, the holes being preferably of a diameter equal to approximately one-third the thickness of the tread 6, the holes 10 being spaced apart a distance not less than the diameter of the holes (preferably about one and one-half diameters) so as to maintain the proper strength and provide cushioning blocks or bridges between the carcass of the tire and the riding surface, of such strength as to prevent complete closure of the holes under load; I also make the road contacting surface of the tread, preferably, convex and of less width than the transverse diameter of the interior air chamber 11 of the tire, thus providing side walls 5 of the tread that are inclined from the major transverse diameter of the tire toward one another in the direction away from the center of the tire (I find this adds to the efficiency of the tire not only when considered from the standpoint of operation but also when considered from the standpoint of the period of the useful life of the tire); the road contacting surface is also preferably grooved at 8 for antiskid purposes as well as to assist in cooling the tread rubber by disturbing the surrounding air and increasing the flexibility of the tread.

A breaker strip 7 of any desired construction may be used in that part of the tread 6 which lies between the set of holes 10 and the road contacting face of the tire.

In manufacturing the tire the carcass is built up with rubber and cord or cord fabric according to the present accepted low pressure cord or balloon tire practice, the tire being built on the usual form. The tread is applied and built up in any approved manner as for example according to the method disclosed in my application filed on the 26th day of November, 1924, Serial No. 752,407, which has matured into Patent No. 1,604,450, October 26, 1926, or in any other suitable way, straight pins being provided and held in position to locate the holes 10 properly. The tire is then vulcanized in a mold so that when the tire is removed from the mold it will, in repose, assume the shape shown in Figure 1.

As will be seen by reference to Figure 1 the tire when un-inflated and in repose has the holes 10 extending straight across, i. e. the axes of the holes 10 lie normal to the central longitudinal plane of the tire. The running surface of the tire tread it will be seen is convex while the general cross section of the tire is that of a flattened circle or oval.

When, however, the tire is inflated to proper pressure it will assume the shape shown in Figure 2, by reference to which it will be seen the axes of the holes 10 are bent outwardly at the center due to the tendency of the tire to assume a circular form in cross section. The tire, however, is so constructed that it does not provide a true circle in cross section when inflated but is more in the nature of an ellipse. The inflation of the tire also causes the road contacting surface to assume a more pronounced convexity than when the tire is not inflated and places the rubber blocks or bridges under more or less compression against the constricting tendency of the outer band containing the breaker strip.

With the tire under normal inflation and carrying its normal load the part of the tire in contact with the road will assume the cross sectional shape shown in Figure 3, that is to say, the convexity of the road contacting surface of the tread will have been reduced to zero with the result that the axes of the holes 10 will now be curved inwardly toward the center, the reverse of the curvature shown in Figure 2, this action being augmented or increased with a consequent flattening of the apertures when the tire passes over a curb or rail or similar obstruction as shown in Figures 4 and 9.

When the tire passes over a stone or similar hump in the road the action is indicated by Figures 5 and 10, from which it will be seen that the hole directly above the ground is further compressed toward the place where the hump is encountered and the tread further bent into the pneumatic cushion or space 11. In this way it will be seen that when the tire is running under normal conditions over a smooth stretch of road (Figure 3) there is a constant displacement of the axes of the holes 10 from an outwardly bowed position (Figure 2) where no pressure is on the tire, to an inwardly bowed position where the point of pressure is encountered, thus constantly setting up a whipping vibration of the axes of the holes which causes air to be agitated, drawn in and ejected through the holes, the action being augmented as the tire passes over road inequalities.

By reason of the fact that the tread is not made so thick as to lose its flexibility the road shocks are partly absorbed by the cushion of the tread, but as the base of the tread, i. e. that part nearest the center of the tire, is not located on a fixed or non-yielding cylinder as it were, (as is the case in cushion tire practice of the Lambert type, see Patent No. 1,429,512 for example) the bulk of all road shocks is transmitted to the carcass of the tire and against the pneumatic cushion of the chamber 11. Hence the tire functions in such manner that it has practically the same resiliency that a standard practice pneumatic tire of the same size would have, but it possesses the added advantage of a flexible, cooled cushion tread of a thickness sufficient to prevent puncturing almost to a certainty.

Tires manufactured in accordance with my invention have gone in excess of 20,000 miles over all kinds of roads without puncture and the life of a tire has been found to be equal to, if not in excess of, the life of a standard balloon tire of the same size.

I am aware that prior to my invention tires of the cushion type have been provided with holes passing through the same and with a relatively small hollow chamber to receive an inner tube to be inflated, (for example the French patent to Francon No. 450,206 of 1912 describes such a structure, see also French Patent No. 357,929 of 1905, see also United States patent to Dickensheet No.1,475,225 of November 27, 1923) but all such patented tires are primarily cushion tires and function as such. Their resiliency does not begin to compare with the resiliency of a pneumatic tire of standard practice. In the tires of the patents above referred to the purpose of the inner tube is principally to effect a securing of the tire beads in the clincher rim so as to enable the use of the cushion tire on clincher rims that have been designed for pneumatic tires. None of the tires of the patents of the prior art referred to depend on the pneumatic action to absorb all ordinary road shocks. Nor is it possible with the thickness of the cushions of the said tires to cause a constant whipping action to take place in the vent holes as is the case with my tire.

As before pointed out my tire is primarily a pneumatic tire and functions as such. It is predominately or wholly pneumatic with simply a separate tread feature or structure which might be termed a cushion tread (but the tire may not be termed a cushion tire). Of course, this tread is heavier and can be built heavier than the standard type tread without danger of separation, due to the fact that the open structure dissipates the heat and breaks up the traction waves and strains which have a tendency to cause tread separation in the old type of tread when the volume is too great, thus, being a better cushion structure than the older type of tread, it affords greater carcass protection. Being strictly a tread structure it permits the carcass to function normally underneath, i. e., the tread will flex and give with the carcass at its outer periphery, whereas an ordinary cushion tire added to a pneumatic would be practically unyielding and move as a unit mass upon the pneumatic part with a tendency to resist shocks instead of absorbing them, thus not only affecting the resiliency of the tire as a whole but also throwing unusual strain upon the carcass and localizing the action in the side walls and the beads (this is what actually occurs in the Dickensheet United States patent tire and the two French tires hereinbefore mentioned) thus shortening the life of the tire instead of increasing it as is the case in a tire built according to my invention.

It will also be noted that with my construction of tire the rubber blocks or pillars between the holes in combination with the rubber bands surrounding the same and encasing the breaker strip, function differently as a part of a pneumatic tire than they would otherwise, in that the strains are distributed more evenly over the rubber members as the result of the carcass yielding under load; as the load is increased it is carried by additional blocks thus preventing the load force being exerted directly upon a single block underneath the center of the load, see Figures 8, 9 and 10.

If desired the holes need not go entirely through the tread from one side to the other but when blind holes are used (see Figure 11) they should be staggered so that openings will appear at both sides and a symmetrical tire produced. When such blind holes are employed the efficiency of the tire, however, is reduced and therefore the preferred embodiment of my invention is that in which the holes go clear through.

When reference is made herein to standard or accepted pneumatic tire practice, I mean by that the practice as employed in building the ordinary high pressure and low pressure tires as instanced in the Letters Patent to A. L. Putnam, No. 1,537,879, granted May 12, 1925.

From the foregoing description, taken in connection with the accompanying drawings, it is thought that the construction and advantages of my invention will be clear to those skilled in the art to which it appertains.

What I claim is:

1. A pneumatic tire having a carcass of rubber and cord construction composed of side walls and a peripheral wall connecting the side walls, said side walls being of substantially uniform thickness and a cushion rubber tread itself having flexible side wall parts and a flexible traction part, the latter being of a thickness approximately three times the carcass thickness and having transverse openings, the axes of which lie in straight lines when the tire is in repose un-inflated and lie in arcs when the tire is inflated substantially as and for the purposes described.

2. A pneumatic tire having a carcass of a thickness and diameter according to the accepted or standard pneumatic tire practice, provided with a tread of cushion rubber having transverse holes in the same, the axes of which holes lie in straight lines when the tire is in repose un-inflated and lie in arcs when the tire is inflated, substantially as and for the purposes described.

3. A pneumatic tire having a carcass of approximately uniform thickness throughout the side walls and peripheral wall of the same, and a cushion rubber tread over the peripheral wall, said tread in its entirety comprising a flexible body of rubber of a sufficient thickness greater than the carcass practically to eliminate punctures without materially reducing the action of the tire as a full pneumatic, said body having transverse holes at relatively close intervals, said holes being located adjacent the periphery of the carcass to leave a substantial band of rubber encircling the set of holes, said tread having a series of peripheral grooves entering from its outer surface thereby increasing the flexibility of said band of rubber, the axes of the holes when the tire is uninflated lying in straight lines parallel to the axis of the tire and when the tire is inflated the axes of the holes being curved or bowed outwardly substantially as shown and described.

4. A pneumatic tire having a carcass of approximately uniform thickness throughout the side walls and peripheral wall of the same, and a cushion rubber tread over the peripheral wall, said tread in its entirety comprising a flexible body of rubber of a sufficient thickness greater than the carcass practically to eliminate punctures without materially reducing the action of the tire as a full pneumatic, said body having transverse holes at relatively close intervals, said holes being located adjacent the periphery of the carcass to leave a substantial band of rubber encircling the set of holes, said tread having a series of peripheral grooves entering from its outer surface thereby increasing the flexibility of said band of rubber, the axes of the holes when the tire is uninflated lying in straight lines parallel to the axis of the tire and when the tire is inflated the axes of the holes being curved or bowed outwardly, the road-contacting face of the tire being curved to a greater degree than the curvature of the axes of the holes when the tire is under inflation substantially as shown and described.

5. A pneumatic tire of standard practice having a tread of cushion rubber thicker than standard practice but of a thickness less than one-half the radial diameter of the pneumatic chamber of the tire, said tread having air passes through the same from side to side with rubber blocks or bridges between adjacent passes, the passes being substantially circular in cross section, the tread rubber extending inwardly toward the rim over the side wall of the carcass of the tire and of gradually decreasing thickness toward the rim, that portion of the tread which extends along the side walls being provided with annular grooves, the road-contacting portion of the tread also being provided with annular grooves thereby increasing the flexibility of the tread structure and adjacent side wall rubber whereby the tread becomes freely flexible in action in all directions and substantially all road shocks will be transmitted to the pneumatic chamber for the purposes specified.

6. A pneumatic tire of standard practice having a tread of cushion rubber thicker than standard practice but of a thickness less than one-half the radial diameter of the pneumatic chamber of the tire, said tread having air passes through the same from side to side with rubber blocks or bridges between adjacent passes, the passes being substantially circular in cross section, the tread rubber extending inwardly toward the rim over the side wall of the carcass of the tire and of gradually decreasing thickness toward the rim, that portion of the tread which extends along the side walls being provided with annular grooves, the road-contacting portion of the tread also being provided with annular grooves thereby increasing the flexibility of the tread structure and adjacent side wall rubber whereby the tread becomes freely flexible in action in all directions and substantially all road shocks will be transmitted to the pneumatic chamber for the purposes specified, that portion of the tread rubber at the ends of the air passes being provided with circular beads surrounding the entrances of the passes, the circular beads projecting from the adjacent surface of the tire to form guards for the entrant edges of the passes' walls substantially as shown and described.

7. A pneumatic tire having a carcass of a thickness and diameter according to the accepted or standard pneumatic tire practice, provided with a wholly flexible tread of cushion rubber having transverse holes in the same, the side walls of the tread having annular grooves and the road-contacting face of the tread having indentations thereby increasing the flexibility of the tread for the purposes specified.

8. A pneumatic tire having a carcass of a thickness and diameter according to the accepted or standard pneumatic tire practice, provided with a wholly flexible tread of cushion rubber having transverse holes in the same, the side walls of the tread having annular grooves and the road-contacting face of the tread having indentations thereby increasing the flexibility of the tread for the purposes specified, the axes of said transverse holes lying in straight lines when the tire is in repose uninflated and lying in arcs when the tire is inflated substantially as shown and described.

9. A pneumatic tire consisting of a carcass composed beyond the rim engaging beads, wholly of rubber and textile material built up according to standard pneumatic tire practice in relation to size and load carrying capacity and inflation pressures, the inflation chamber of the tire being of greater diameter in all directions than the width of the rim that receives the tire, and a tread composed wholly of flexible elastic materials built up of a thickness in excess of standard pneumatic tire practice and provided at frequent intervals with transverse holes of approximately circular cross section, the holes lying adjacent the carcass thereby leaving a substantial thickness of tread rubber beyond the holes, that portion of the tread rubber lying beyond the holes having grooves extending inwardly from the outer face toward the carcass, which grooves terminate short of said holes, all being arranged so that the tire will function as a normal full pneumatic tire, all parts of the tread of the tire beyond the carcass being free to flex and bend in any and all directions.

10. A pneumatic tire consisting of a carcass composed beyond the rim engaging beads, wholly of rubber and textile material built up according to standard pneumatic tire practice in relation to size and load carrying capacity and inflation pressures, the inflation chamber of the tire being of greater diameter in all directions than the width of the rim that receives the tire, and a tread composed wholly of flexible elastic materials built up of a thickness in excess of standard pneumatic tire practice and provided at frequent intervals with transverse holes of approximately circular cross section, the holes lying adjacent the carcass thereby leaving a substantial thickness of tread rubber beyond the holes, that portion of the tread rubber lying beyond the holes having grooves extending inwardly from the outer face toward the carcass, which grooves terminate short of said holes, all being arranged so that the tire will function as a normal full pneumatic tire, all parts of the tread of the tire beyond the carcass being free to flex and bend in any and all directions, the axes of the holes being located so as to lie outwardly bowed when the tire is inflated and under no load and to lie horizontally when the tire is under normal load and to bow inwardly when the tire rides over road obstructions or is under abnormal load whereby the holes perform a whipping motion in action and also perform the functions of breaking up the traction wave and providing means to cool the tread rubber, substantially as shown and described.

11. A pneumatic tire having a carcass of a thickness and diameter according to the accepted or standard pneumatic tire practice, provided with a wholly flexible tread of cushion rubber having transverse holes in the same, the side walls of the tread having grooves and the road-contacting face of the tread having indentations thereby increasing the flexibility of the tread for the purposes specified.

12. A pneumatic tire consisting of a carcass composed beyond the rim engaging beads, wholly of rubber and textile mterial built up according to standard pneumatic tire practice in relation to size and load carrying capacity and inflation pressures, the inflation chamber of the tire being of greater diameter in all directions than the width of the rim that receives the tire, and a tread composed wholly of flexible elastic materials built up of a thickness in excess of standard pneumatic tire practice and provided at frequent intervals with transverse holes, the holes lying adjacent the carcass thereby leaving a substantial thickness of tread rubber beyond the holes, that portion of the tread rubber lying beyond the holes having indentations extending inwardly from the outer face toward the carcass, which indentations terminate short of said holes, and the side walls of the tread having indentations, all being arranged so that the tire will function as a normal full pneumatic tire, all parts of the tread of the tire beyond the carcass being free to flex and bend in any and all directions.

FREDERICK A. KRUSEMARK.